US011393126B2

(12) United States Patent
Markkassery

(10) Patent No.: US 11,393,126 B2
(45) Date of Patent: Jul. 19, 2022

(54) METHOD AND APPARATUS FOR CALIBRATING THE EXTRINSIC PARAMETER OF AN IMAGE SENSOR

(71) Applicant: Continental Automotive GmbH, Hannover (DE)

(72) Inventor: Sreejith Markkassery, Singapore (SG)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 238 days.

(21) Appl. No.: 16/717,178

(22) Filed: Dec. 17, 2019

(65) Prior Publication Data
US 2020/0193641 A1 Jun. 18, 2020

(30) Foreign Application Priority Data
Dec. 18, 2018 (GB) ...................................... 1820572

(51) Int. Cl.
*G06T 7/80* (2017.01)
*H04N 5/225* (2006.01)
*H04N 5/232* (2006.01)

(52) U.S. Cl.
CPC ............. *G06T 7/80* (2017.01); *H04N 5/2253* (2013.01); *H04N 5/23238* (2013.01)

(58) Field of Classification Search
None
See application file for complete search history.

(56) References Cited

U.S. PATENT DOCUMENTS

| 8,872,925 B2 | 10/2014 | Xie et al. |
| 9,412,168 B2 | 8/2016 | Shimizu |

(Continued)

FOREIGN PATENT DOCUMENTS

| DE | 102013222291 A1 | 5/2015 |
| JP | 2008269139 A | 11/2008 |

(Continued)

OTHER PUBLICATIONS

Chinese Office Action for Chinese Application No. 201911333327.X, dated Apr. 29, 2021, with translation, 8 pages.

(Continued)

*Primary Examiner* — Kaitlin A Retallick
(74) *Attorney, Agent, or Firm* — RatnerPrestia

(57) ABSTRACT

A method for calibrating one or more extrinsic parameters of an image sensor includes selecting a first set of parallel feature edges appearing in an image frame captured by the image sensor and determining reference vanishing points for the first set of parallel feature edges. Selecting a second set of parallel feature edges and projecting a plurality of points from the second set parallel feature edges onto the projection reference frame of the image sensor. The method determines the second set of parallel feature edges, second vanishing points located on the projection reference frame and reduces any deviation in location of the second vanishing points from the reference vanishing points until the deviation is within acceptable predefined limits by recursively: modifying the pre-existing projection matrix, projecting a plurality of points from the second set parallel feature edges onto the projection reference frame and determining the second vanishing points after projecting.

17 Claims, 7 Drawing Sheets

(56) References Cited

U.S. PATENT DOCUMENTS

| | | | |
|---|---|---|---|
| 10,565,736 B2 | 2/2020 | Oba et al. | |
| 2004/0196282 A1* | 10/2004 | Oh | G06T 17/00 |
| | | | 345/419 |
| 2008/0309763 A1 | 12/2008 | Hongo | |
| 2010/0322476 A1 | 12/2010 | Kanhere et al. | |
| 2012/0081512 A1* | 4/2012 | Shimizu | G06T 7/80 |
| | | | 348/36 |
| 2016/0227207 A1 | 8/2016 | Lee | |
| 2017/0337699 A1 | 11/2017 | Wu et al. | |
| 2018/0061011 A1* | 3/2018 | Kim | G06T 7/11 |
| 2019/0082156 A1 | 3/2019 | Zhang et al. | |

FOREIGN PATENT DOCUMENTS

| | | |
|---|---|---|
| JP | 2011215063 A | 10/2011 |
| WO | 2010146695 A1 | 12/2010 |
| WO | 2017122552 A1 | 7/2017 |

OTHER PUBLICATIONS

Korean Notification of Reason for Refusal for Korean Application No. 10-2019-0168283, dated May 25, 2021, with translation, 9 pages.

Japanese Decision to Grant a Patent for Japanese Application Na. 2019-218641, dated Jul. 1, 2021, with translation, 5 pages.

Great Britain Search Report for Great Britain Application No. GB1820572.4, dated May 8, 2019, 3 pages.

Hughes et al., "Equidistant (f⊖) Fish-eye Perspective with Application in Distortion Centre Estimation", Image and Vision Computing, 2010, vol. 28, pp. 538-551.

Yue et al., "Direct Fitting of Center Collinear Circles For Equidistant Fish-eye Camera Calibration", Journal of Electronic Imaging, 2013, vol. 22, No. 1, pp. 013004-1-013004-7.

Zhu et al., "Using Vanishing Points to Estimate Parameters of Fisheye Camera", IET Comput. Vis., 2013, vol. 7, Issue 5, pp. 362-372.

Extended European Search Report for European Application No. 19217696.4, dated Mar. 19, 2020, 11 pages.

Japanese Notice of Reasons for Refusal for Japanese Application No. 2019-218641, dated Jan. 6, 2021 with translation, 7 pages.

Chinese Notice of Allowance for Chinese Application No. 201911333327.X, dated Sep. 20. 2021 with search report, 5 pages.

* cited by examiner

METHOD AND APPARATUS FOR CALIBRATING THE EXTRINSIC PARAMETER OF AN IMAGE SENSOR

CROSS REFERENCE TO RELATED APPLICATIONS

This application claims priority to Great Britain Patent Application No. 1820572.4, filed Dec. 18, 2018, the contents of such application being incorporated by reference herein.

FIELD OF THE INVENTION

The present disclosure relates to methods, device and computer-readable storage medium for calibrating one or more extrinsic parameters of an image sensor.

BACKGROUND OF THE INVENTION

Modern vehicles are frequently equipped with various electronic systems intended to assist a driver in the driving of a vehicle. These electronic systems often involve the use of one or more vehicle mounted image sensors which are used to capture images of the vehicle and its external environment. The images captured are analysed and may be used either alone or in combination with input from other environment sensors to provide one or more driver assistance functions such as object detection, lane departure warning, parking assist and distance measurement. Vehicle mounted vision-based sensors may also be used to provide a driver with a more comprehensive view of the external environment including access to viewpoints which were previously unobtainable. This is accomplished by displaying to the driver a composite image generated by stitching together images from the multiple vision-based sensors mounted at different parts of a vehicle. An example is the surround view system which often includes four wide angle vision-based sensors mounted externally at the front, rear and sides of the vehicle. The image sensors in a surround view system typically have a horizontal field of view that is more than 180 degrees. A 360-degree view of a vehicle's environment is obtained by stitching together images from the surround view image sensors.

However, the process of generating a composite image involves aligning the images from different image sensors before stitching them together. This requires knowledge of the projection matrix used to map 3D points in the real world to the 2D image plane of an image sensor. Similarly, knowledge of the projection matrix is also required for the operation of other image-based driver assistance functions such as distance measurement from images. The actual projection matrix associated with an image sensor may vary depending on the type of sensor used but projection matrices are generally defined in terms of the intrinsic and extrinsic parameters associated with an image sensor. Intrinsic parameters are generally concerned with the optics of an image sensor, that is, how light is projected through the image sensor and onto the image plane of the sensor. They include parameters such as focal length and focal point. Extrinsic parameters, on the other hand, relate to the position and orientation of an image sensor and may be defined relative to coordinate axes used as a frame of reference (i.e. absolute extrinsic parameters). Position related extrinsic parameters describe the location of an image sensor along an x, y and z axis of a frame of reference while orientation related extrinsic parameters describe the rotation of the image sensor along the x, y and z axis. Examples of coordinate axes commonly used as a frame of reference for extrinsic parameters include a vehicle co-ordinate system where the origin of the co-ordinate axes is located on the vehicle itself and a world co-ordinate system. The extrinsic parameters of an image sensor may also be measured relative to that of other image sensors (i.e. relative extrinsic parameters).

Therefore, in order to facilitate the proper operation of image-based driver assistance functions, calibration for establishing the extrinsic parameters of an image sensor is essential.

However, a problem arises in that the position and/or orientation of an image sensor are subject to changes caused by various factors such as loading of the vehicle, effects of wear and tear, replacement of various vehicle parts and vibrations caused by bumpy roads and door slams. This in turn causes changes in the extrinsic parameters of the image sensor.

In view of the foregoing, robust online extrinsic parameter calibration methods which do not require dedicated calibration structures with known geometry and are capable of being conducted outside of a vehicle workshop setting are desirable.

SUMMARY OF THE INVENTION

Aspects of this disclosure provide methods, device and computer-readable storage medium for calibrating one or more extrinsic parameters of an image sensor.

A first aspect of this disclosure provides a method for calibrating one or more extrinsic parameters of an image sensor comprising selecting a first set of parallel feature edges appearing in an image frame captured by the image sensor and determining reference vanishing points for the first set of parallel feature edges, the reference vanishing points being located on a projection reference frame of the image sensor. The first set of parallel feature edges may comprise two parallel feature edges. In some implementations the first set of parallel feature edges may comprise at least one of lane marking, parking line or road boundary. The method also comprises selecting a second set of parallel feature edges which are parallel to the first set of parallel feature edges, projecting a plurality of points from the second set parallel feature edges onto the projection reference frame based on a pre-existing projection matrix of the image sensor and determining for the second set of parallel feature edges, second vanishing points located on the projection reference frame. The second set of parallel feature edges may be feature edges which exist in real life or virtual feature edges. Any deviation in location of the second vanishing points from the reference vanishing points is reduced until the deviation is within one or more predefined limits by recursively performing at least the following steps: modifying the pre-existing projection matrix by adjusting one or more of the extrinsic parameters, projecting a plurality of points from the second set parallel feature edges onto the projection reference frame using the modified pre-existing projection matrix and determining the second vanishing points after projecting.

In some implementations, the image sensor is one which can be modelled using the sphere camera model. In one variation where a sphere camera image sensor is used, determining the first pair of reference vanishing points for the first set of parallel features may comprise fitting a first circle and second circle to image points of a first and second feature edge in the first set of parallel edges and determining where the first and second circles intersect. In this case, the projection reference frame of the image sensor is the image plane of the image sensor. The second vanishing points for the second set of parallel feature edges may also be determined by fitting a third circle and fourth circle to image points of a third and fourth feature edge in the second set of parallel edges obtained by projecting a plurality of points from the third and fourth feature edges in the second set parallel feature edges onto the image plane based on a pre-existing projection matrix of the image sensor, and determining where the third and fourth circles intersect. Fitting of at least the first, second, third or fourth circle may be based on minimising a Lose function. In an optional implementation, reducing any deviation in location of the second vanishing points from the reference vanishing points until the deviation is within the one or more predefined limits comprises drawing a first connecting line joining the reference vanishing points and drawing a second connecting line joining the second vanishing points. Modifying the pre-existing projection matrix by adjusting one or more of the extrinsic parameters may then comprise initially adjusting the one or more extrinsic parameters to reduce any gradient deviation between the second and first connecting lines until the gradient deviation is within a gradient limit before adjusting the one or more extrinsic parameters to reduce any deviations in location or length of the second connecting line from the first connecting line. A plurality of points from the second set parallel feature edges is projected onto the projection reference frame using the modified pre-existing projection matrix after each adjustment of the one or more extrinsic parameters and the second vanishing points determined after projecting until any deviation in location of the second vanishing points from the reference vanishing points is within one or more predefined limits. In one variation, initially adjusting the one or more extrinsic parameters to reduce the gradient deviation between the second and first connecting lines until the gradient deviation is within the gradient limit comprises adjusting one or more of the extrinsic parameters which is orientation related and adjusting the one or more extrinsic parameters to reduce any deviation in location and/or length of the first and second connecting lines comprises adjusting one or more of the extrinsic parameters which is translation related. In another implementation where the image sensor can be modelled using the sphere camera model, the projection reference frame is a unitary sphere.

In another exemplary implementation, the image sensor is mounted on a vehicle. Selecting a first set of parallel feature edges may comprise detecting at least two feature edges in the image frame, and determining if the feature edges are parallel by checking at least a steering angle or wheel angle of the vehicle when the image frame was captured. In some implementations, the second set of parallel feature edges may be obtained by shifting the first set of parallel feature edges along a co-ordinate axis of the vehicle located along a lateral axis of the vehicle.

Another aspect of the disclosure provides a device for calibrating one or more extrinsic parameters of an image sensor comprising a processor, at least one memory coupled to the processor and storing instructions executable by the processor causing the processor to select a first set of parallel feature edges appearing in an image frame captured by the image sensor and determine reference vanishing points for the first set of parallel feature edges, the reference vanishing points being located on a projection reference frame of the image sensor. The processor is also caused to select a second set of parallel feature edges which are parallel to the first set of parallel feature edges, project a plurality of points from the second set parallel feature edges onto the projection reference frame based on a pre-existing projection matrix of the image sensor and determine for the second set of parallel feature edges, second vanishing points located on the projection reference frame. Any deviation in location of the second vanishing points from the reference vanishing points is reduced until the deviation is within one or more predefined limits by recursively performing at least the following steps: modify the pre-existing projection matrix by adjusting one or more of the extrinsic parameters, project a plurality of points from the second set parallel feature edges onto the projection reference frame using the modified pre-existing projection matrix and determine the second vanishing points after projecting.

In some implementations, wherein the image sensor is one which can be modelled using the sphere camera model, the projection reference frame is the image plane of the image sensor and the at least one memory causes the processor to determine the reference vanishing points by fitting a first circle and second circle to image points of a first and second feature edge in the first set of parallel edges wherein the reference vanishing points are located where the first and second circles intersect, determine the second vanishing points by fitting a third circle and fourth circle to image points of a third and fourth feature edge in the second set of parallel edges obtained by projecting a plurality of points from the third and fourth feature edges onto the image plane of the image sensor. The second vanishing points are located where the third and fourth circles intersect. Where the image sensor is mounted on a vehicle, the at least one memory may cause the processor to select a first set of parallel feature edges by at least the following steps: detecting at least two straight line feature edges in the image frame, and determining if the straight line feature edges are parallel by checking at least a steering angle or wheel angle of the vehicle when the image frame was captured. The at least one memory may also cause the processor to select a second set of parallel feature edges by shifting the first set of parallel feature edges along a co-ordinate axis of the vehicle that is located along a lateral axis of the vehicle.

Other aspects of this disclosure may also include a non-transitory computer-readable storage medium comprising computer-readable instructions for carrying out the methods discussed in this disclosure. In another variation, a vehicle comprising a device for calibrating one or more extrinsic parameters of an image sensor according to this disclosure may be provided.

The details of one or more implementations of the disclosure are set forth in the accompanying drawings and the description below. Other aspects, features, and advantages will be apparent from the description and drawings, and from the claims.

DETAILED DESCRIPTION OF THE PREFERRED EMBODIMENTS

In the following detailed description, reference is made to the accompanying figures. In the figures, similar symbols typically identify similar components, unless context dictates otherwise.

For perspective projection of 3-dimensional points in the real world to a 2-dimensional image plane, an infinite scene line is imaged as a line terminating in a vanishing point. By the same theory, world lines (such as lane markings) which are parallel to each other are imaged as converging lines with a common vanishing point. An aspect of this disclosure relies on the above described vanishing point concept as the basis for performing extrinsic parameter calibration of an image sensor. Depending on the type of lens system used in the image sensor being calibrated, an aspect of this disclosure allows extrinsic parameter calibration to be performed so long as there are calibration structures comprising at least two real world parallel feature edges. For example, the extrinsic parameters of image sensors based on the sphere camera model may be calibrated using a first set of parallel feature edges consisting of two real world parallel feature edges. A second set of parallel feature edges may be feature edges which exist in the real world or virtual feature edges. One of the advantages associated with an aspect of this disclosure is that dedicated calibration structures with known dimensions such as those used in offline calibration methods are not essential for calibration. Calibration can be conducted using feature edges available on normal roads. For example, parallel features commonly found on roads such as lane/road markings, parking lines, the side of a curb or road or a combination thereof may be used. Accordingly, an aspect of this disclosure may be applied to both offline and online extrinsic calibration methods. Since lane markings and parking lines are generally highly standardized around the world, the calibration methods and apparatus described therein may be robustly deployed in machine vision modules mounted on vehicle platforms.

Figure 1:
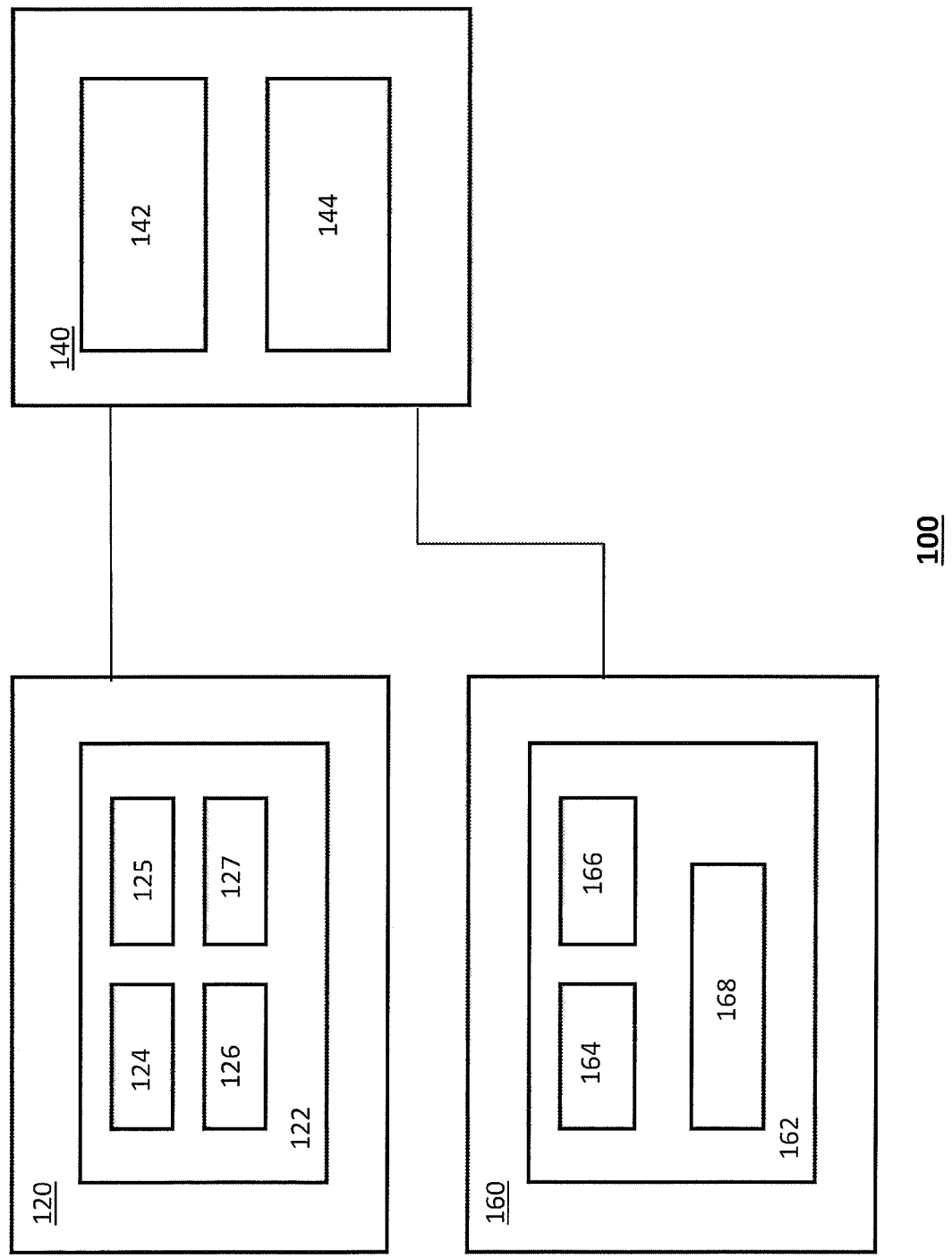
FIG. 1 is a functional block diagram of a system 100 comprising a machine vision module operable to calibrate one or more extrinsic parameters of an image sensor according to one implementation of this disclosure.

FIG. 1 is a functional block diagram of an exemplary system 100 comprising a machine vision module 140 configured to perform an automated method for calibrating one or more extrinsic parameters of an image sensor according to one implementation of an aspect of this disclosure. The calibration method is based on comparing the vanishing points associated with a first and second set of parallel feature edges which are parallel to each other in the real world co-ordinates. The first set of parallel feature edges are feature edges which exist in the real world while either real or virtual feature edges may be used for the second set of parallel feature edges. Vanishing points for the second set of parallel feature edges may be derived by projecting a plurality of points from the second set parallel feature edges onto a projection reference frame of the image sensor based on a pre-existing projection matrix of the image sensor. One or more extrinsic parameters is derived by reducing any deviation in location of the second vanishing points from the reference vanishing points until the deviation is within one or more predefined limits by recursively modifying the pre-existing projection matrix by adjusting one or more of the extrinsic parameters, projecting a plurality of points from the second set parallel feature edges onto the projection reference frame using the modified pre-existing projection matrix and checking if any deviation in the location of the resulting second vanishing points after projecting is within one or more predefined limits.

The system 100 which is associated with a vehicle also comprises an environment module 120 and a vehicle system 160 both of which are in communication with the machine vision module 140. The environment module 120 comprises environment sensors operative to sense and collect information about an external environment of the vehicle. In the FIG. 1 implementation, the environment module comprises an image sensor module 122 including 4 image sensors (124-127) mounted externally at different parts of the vehicle. Each of the image sensors having its own set of extrinsic parameters. By way of example, the image sensors may be wide-angle cameras (124-127) mounted externally on the side mirrors and rear bumper of a vehicle like in the FIG. 2 example. It will be appreciated by a person skilled in the art that the image sensor module 122 may also comprise other types (e.g. vision-based mono cameras) and different number of image sensors. Furthermore, other types of environment sensors such as radar, lidar and ultrasonic sensors may also be included in the environment module.

The machine vision module 140 in the FIG. 1 implementation comprises a computing processor 142 and a hardware memory 144 in communication with the processor 142. The computing processor 142 may for example be a microcontroller and graphics processing units (GPUs) capable of accessing the memory 144 to store information and execute instructions stored therein may also be used. The memory 144 may comprise a non-transient memory (e.g. hard drive, flash memory, random-access memory), transient memory or a combination thereof. Alternatively, the processor 142 and memory 144 may also be integrated on a single integrated circuit. The memory 144 stores information accessible by the processor 142 and data which may be stored, retrieved or otherwise used by the processor 142. For example, the processor 142 may execute automated methods for calibrating one or more extrinsic parameters of an image sensor according to an aspect of this disclosure based on instructions stored in the memory 144. The memory may also contain instructions for the processor 142 to determine if an image frame may be used for extrinsic parameter calibration. This may be achieved by checking if characteristics associated with the image frame meets one or more image selection criteria. The image selection criteria would include at least one or more conditions associated with the availability of a suitable calibration structure in the sample image. As discussed earlier, the extrinsic parameter calibration method in an aspect of this disclosure is based on the concept of vanishing points and a first set of parallel feature edges comprising at least two calibration feature edges parallel to each other is required. In some implementations, the process of determining if an image frame contains a first set of parallel feature edges may include detecting for the presence of straight line feature edges and then checking if they are parallel. The detection of straight line feature edges may involve detecting for the presence of edges in an image frame and determining which of the detected edges are straight lines. Alternatively, potential calibration structures may be selected from a pre-defined list of structures and these structures checked for actual suitability as calibration structures. For example, the pre-defined list may include lane and road markings as potential calibration structures. In some implementations, parallelism of feature edges may be verified using various methods such as the moving direction of the vehicle when the image frame was taken. The moving direction may be obtained from steering and/or wheel angle information which the processor 142 can obtain from one or more sub-modules in the vehicle system 160. For example, a steering angle sensor 164 and a wheel angle sensor 166 in the ESC system 162. The image selection criterion may also include elements tied to the quality of the sample image and in particular, the image quality of potential calibration structures in the sample image.

The processor 142 may then determine for a first and second set of parallel feature edges, vanishing points located on a projection reference frame of the image sensor being calibrated. The projection reference frame may, for example, be the image plane of the image sensor or an intermediate projection reference frame such as a unitary sphere. By way of example, image sensors which can be modelled using the sphere camera model may use the image plane as projection reference frame and reference vanishing points for the first set of parallel feature edges are determined by fitting circles to image points of parallel feature edges in the first set of parallel features. Meanwhile, second vanishing points associated with the second set of parallel feature edges are derived by projecting points from parallel feature edges onto the image plane using a pre-existing projection matrix and finding the intersection points between the resulting images of the feature edges. In another implementation, the unitary sphere may be used instead as the projection reference frame in a sphere camera image sensor calibration process. The location of the reference vanishing points on the unitary sphere may be derived by pixel mapping while the location of the second vanishing point on the same obtained by projecting a plurality of points from the second set parallel feature edges onto the unitary sphere based on a pre-existing projection matrix. Pixel mapping refers to the mapping of image points associated with feature edges in a first set of parallel feature edges onto the unitary sphere pixel by pixel by circle fitting as respective circles. Although FIG. 1 functionally illustrates the processor 142 and memory 144 as being located within the same block, it will be appreciated by an ordinary person skilled in the art that the processor and memory may actually comprise multiple processors and/or memories that are located in different housing.

Accordingly, references to a processor or memory will be understood to include references to a collection of processors and/or memories capable of performing the functions of the machine vision module described in an aspect of this disclosure. Further, it will be appreciated by a person skilled in the art that the machine vision module may exist independently of other modules or components. Alternatively, it may also be a shared element or process of other modules, programs or hardware. For instance, the processor 142 and memory 144 may also be configured to perform object detection functions and/or lane keeping assist functions.

In some implementations, the machine vision module 140 may be configured to provide automated image sensor calibration functions based on information from other vehicle modules. For example, in the FIG. 1 implementation, the machine vision module 140 is in communication with a vehicle system 160 which comprises an electronic stability control (ESC) system 162. The ESC system may include a steering angle sensor 164 which measures the steering wheel position angle and rate of turn, a wheel angle sensor 166 and an ESC electronic control unit (ECU) 168. In some variations, the machine vision module 140 may use information from the ESC system 162 to determine if a sample image meets one or more image selection criteria. For example, if a first set of parallel feature edges used for calibration comprises lane markings or road boundaries, one of the image selection criteria may require the vehicle to be travelling in a substantially straight line when a sample image was taken so that the feature edges in the first set are parallel to each other. Information on the vehicle's direction of travel may be obtained from the steering angle sensor 164 which measures the vehicle's steering wheel position angle, the wheel angle sensor 166 or a combination thereof.

Figure 2:
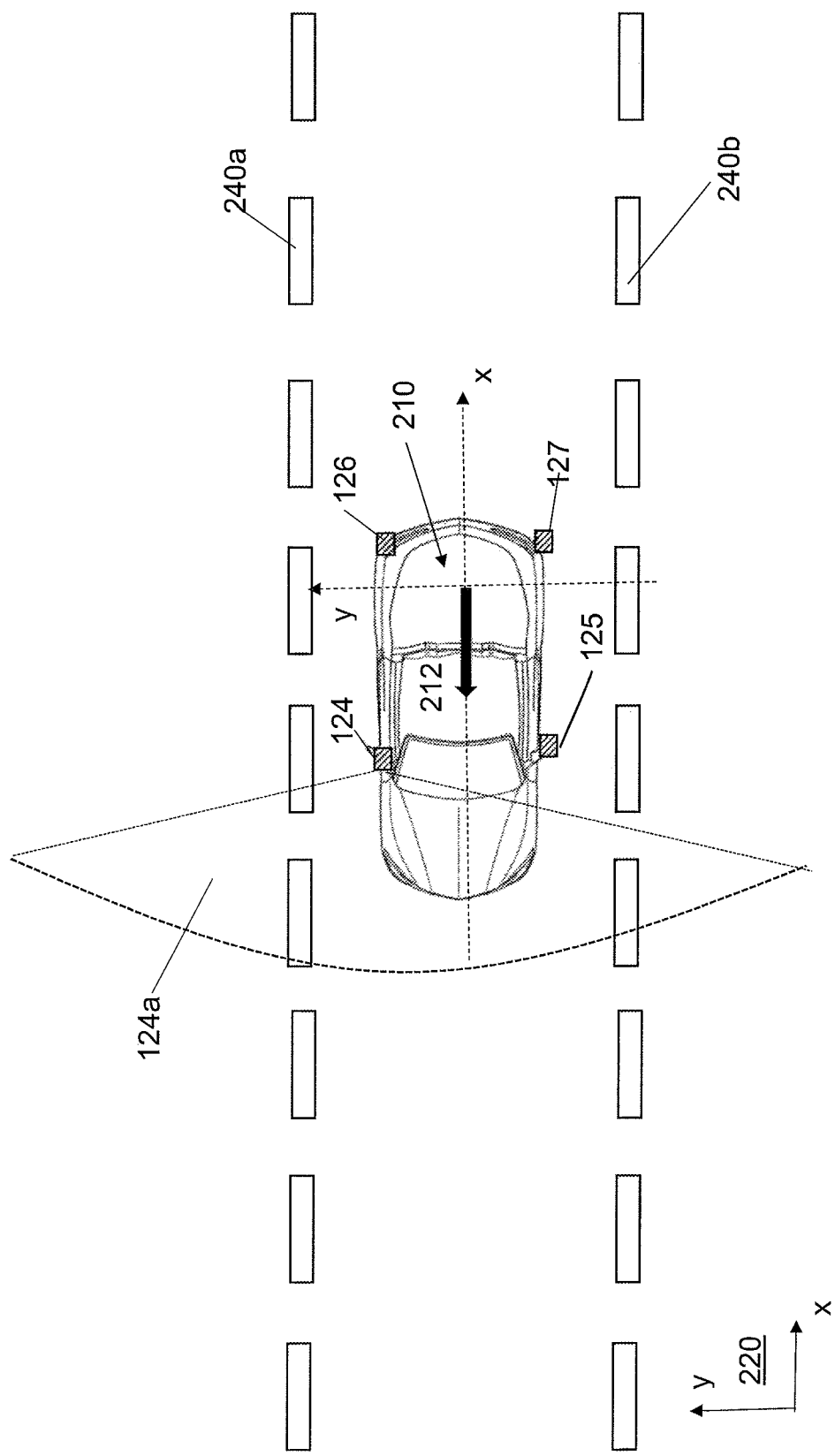
FIG. 2 illustrates an exemplary scenario of a vehicle mounted image sensor capturing an image of a first set of parallel feature edges used for extrinsic parameter calibration.

FIG. 2 illustrates an example of a vehicle 210 equipped with a system such as the one illustrated in FIG. 1. It is to be appreciated that although the examples provided illustrate methods and devices being used in the context of calibrating the extrinsic parameters of image sensors mounted on a vehicle, this is not intended to be limiting. An aspect of the disclosure may also be applied to the calibrate image sensors mounted on other types of platforms whether stationary, mobile, autonomous or non-autonomous. In FIG. 2, the vehicle 210 comprises four wide-angle image sensors (124-127) with fish eye lenses. The four image sensors are mounted at the side view mirrors located on each side of the vehicle (124, 125) and corners of the rear bumper (126, 127). Images from the image sensors may be combined to provide a driver with a 360-degree view around the vehicle. The calibration may also be applied to other types of image sensors mounted on the vehicle such as mono and stereo cameras instead of wide-angle cameras. Images captured by the image sensors (124-127) are transmitted to the machine vision module 140 where they may be used by the processor 142 for calibrating one or more extrinsic parameters of the respective image sensors using the methods described in an aspect of this disclosure. In some implementations, the images may be pre-processed, for example, to remove noise and distortion before it is transmitted to the machine vision module 140. The pre-processing may be performed, for example, by a processor in the environment module 120. The pre-processing may also be undertaken by the processor 142 prior to using the images for calibration. In FIG. 2, the vehicle 210 is moving over a road which forms a ground plane 220 extending in the 2-dimensional x-y world co-ordinate space and intersecting a z-axis extending in a perpendicular direction out of the plane of FIG. 2. The ground plane 220 comprises parallel lane markings (240a, 240b) disposed on both sides of the vehicle 210. The first image sensor 124 which is mounted on the right side view mirror has a field of view denoted by the reference numeral 124a. By way of example, the machine vision module 140 may be configured to calibrate one or more extrinsic parameters of the first image sensor 124 using a first set of parallel feature edges appearing in an image captured by the first image sensor 124. As discussed earlier, an aspect of this disclosure only requires a first set of parallel feature edges comprising two parallel feature edges for extrinsic parameter calibration of image sensors such as sphere camera image sensors. Dedicated structures with known dimensions are also not essential. For instance, the first set of parallel feature edges may comprise the parallel lane markings (240a, 240b). Other parallel edge features such as road markings, the side of a curb or road may also be used as an alternative or in combination with lane markings to form the first set of parallel feature edges. For example, a first set of parallel feature edges may include a row of lane markings in combination with a curb.

Figure 3:
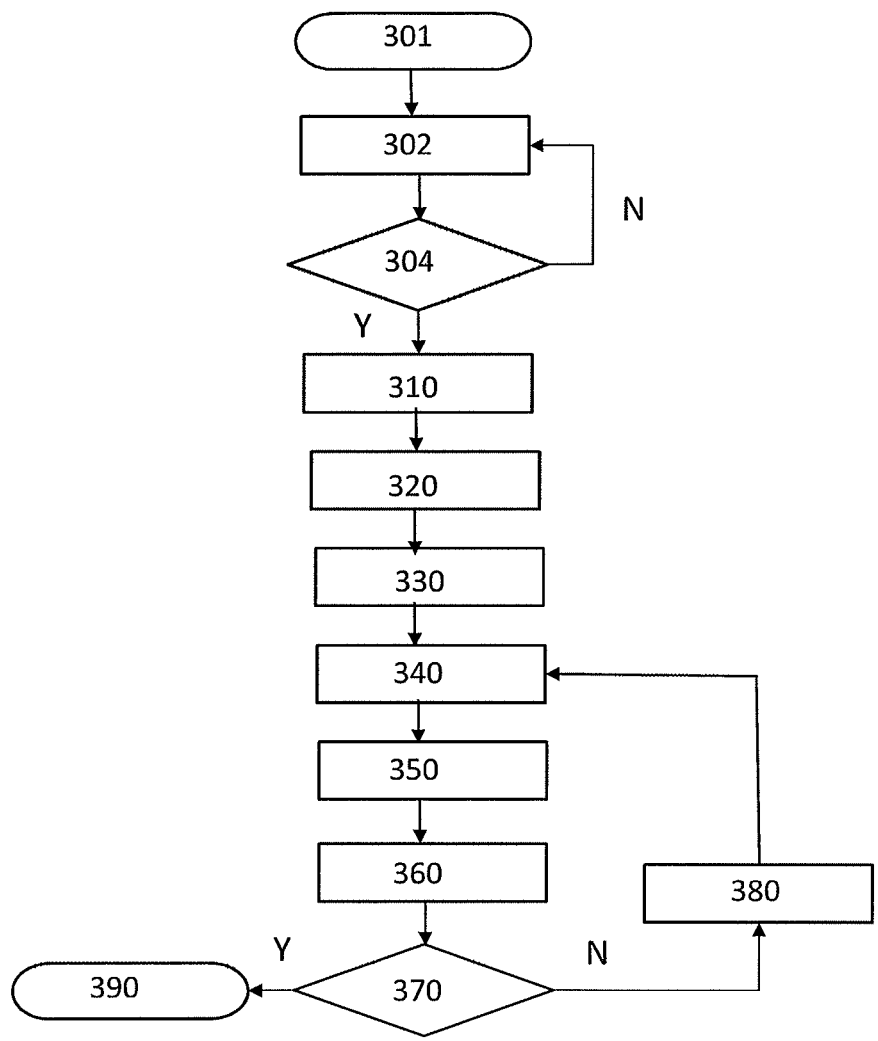
FIG. 3 is a flow diagram illustrating an automated method for calibrating one or more extrinsic parameters of an image sensor according to one implementation of this disclosure.

FIG. 3 is an exemplary flow diagram illustrating an automated method 300 for calibrating one or more extrinsic parameters of an image sensor based on the vanishing point concept discussed earlier. According to one implementation, the method may be performed by a machine vision module 140 located within a system 100 such as the one illustrated in FIG. 1. However, it will be appreciated that this is not intended to be limiting on the disclosure and other hardware and software configurations may also be suitable. For instance, the processor used for performing the method may be located elsewhere instead of the machine vision module and the method 300 may implemented by a combination of multiple processors located in different modules and collectively performing the various steps in the method. The method 300 starts at block 301 and may be initiated upon the processor 142 in the machine vision module 140 receiving a request to calibrate one or more extrinsic parameters of an image sensor. Such request may be made, for example, by the image sensor requiring calibration or a processor located within the environment module 120. The request may also be made either recurrently and/or based on the occurrence of one or more specified events. For instance, the request may be made recurrently based on the distance travelled by the vehicle and/or the number of vehicle starts. It may also be triggered based on the occurrence of events such as events which may trigger a change in extrinsic parameters or when a potential drift in extrinsic parameters is detected. Examples include when changes in loading of the vehicle exceeds a specified threshold, when a degradation in the operation of one or more functions relying on images from one or more image sensors is detected, or a combination thereof. After the initiation of the process in block 301, the process continues to block 302 where the machine vision module selects a sample image frame which may be used for calibrating the image sensor it is taken from. The image sensor may be triggered to capture the sample image frame upon initiation of the method 300 in block 301. Triggering of the image sensor may also be based on additional criterion such as whether the vehicle is moving straight so that feature edges used for calibration such as lane markings will appear as parallel in an image frame. In other variations, the image sensor be configured to continuously capture images of the vehicle's environment once the ignition is switched on and the sample image frame is selected from these images.

After a sample image frame is selected in block 302, the process goes on to decision block 304 where the processor 142 determines if the selected sample image meets one or more image selection criteria. The image selection criteria determines if the sample image frame is suitable for use in calibrating one or more extrinsic parameters. The image selection criteria would include at least one or more conditions associated with the availability of suitable calibration structure in the sample image. As discussed earlier, extrinsic parameter calibration in an aspect of this disclosure is based on the concept of vanishing points and a first set of parallel feature edges is required as calibration structures. Depending on the type of image sensors used, the first set of parallel feature edges may require more parallel feature edges to determine the reference vanishing points. However, the first set of parallel feature edges should comprise at least two feature edges which are parallel to each other. In some implementations, the machine vision module 140 may be configured to identify potential calibration structures by first detecting for the presence of straight line feature edges in the sample image. Prior to such detection, the sample image may be subjected to image enhancement processes which are designed to improve edge detection capability such as colour correction, colour masking and noise filtering. The detection of straight line feature edges may involve detecting for the presence of edges and then determining which of the detected edges are straight lines. The detection process may be applied to the entire sample image or just specific regions where calibration structures are more likely to be found. Examples include portions of the vehicular road where lane markings and other features used to demarcate lane or road boundaries are located. Edge detection algorithms such as canny edge detection algorithm, Smallest Univalue Segment Assimilating Nucleus (SUSAN) edge detection algorithm, Sobel filter and other algorithms based on canny edge detection may be used for detecting the presence of edges while Hough Transform may be used to detect which of the detected edges are straight lines. Once straight-line feature edges (if any) have been identified, they may be grouped into respective sets of potential parallel feature edges and flagged as regions of interest (ROI). In another implementation, potential calibration structures may be selected from a pre-defined list of structures and these structures checked for actual suitability as calibration structures. For example, the pre-defined list may include lane and road markings as potential calibration structures. The machine vision module may rely on information from other operations such as lane keeping function for information on the location of lane markings in an image. After identifying potential first set of parallel features, the process may check if these potential feature edges are parallel. In some implementations, parallelism may be inferred by looking the vehicle's direction of travel when the sample image was recorded. For instance, if a pair of lane markings are used as calibration structures, they may be assumed to be parallel in an image frame if the steering angle and/or wheel angle is close to zero (e.g. 0.2 degrees or less) when the image frame was captured. The steering angle and wheel angle of the vehicle may be obtained from a steering angle sensor 164 and a wheel angle sensor 166 respectively. Using the scenario in FIG. 2 as an illustration, the vehicle co-ordinate system comprises an x-axis extending along the longitudinal axis of the vehicle, a y-axis extending along a lateral axis of the vehicle such as the axle joining two side wheels and a z-axis extending out of the plane of the paper perpendicular to the x and y axis. During normal operation, the steering angle and wheel angle of the vehicle is zero if the vehicle's direction of travel 212 is along the x-axis of the vehicle co-ordinate system. Accordingly, when the steering angle of the vehicle is substantially zero, the lane markings (240a, 240b) will appear as substantially parallel in an image captured by the first image sensor 124 since the x-axis of the vehicle 210 will be parallel to the lane markings.

The image selection criterion may also include elements tied to the quality of the sample image and in particular, the image quality of potential calibration structures in the sample image.

Image quality may be assessed based one or more factors such as feature sharpness, noise level, level of distortion, contrast and resolution. For example, the sample image should not be under or over-exposed. Feature edges which are used as calibration structures should also have edges which are clear and not blurred or defocused. The image quality related criteria may also require a minimum level of contrast between the potential calibration structure and the background such as a road surface so that the calibration structure is clearly visible. For instance, if the potential calibration structure comprises lane markings like in the FIG. 2 example, there should be sufficient contrast between the lane markings and the road surface such that the lane markings are clearly distinguishable from the road surface in the sample image frame. Where more than one potential calibration structure has been identified in a sample image, those structures which do not meet the image quality related requirements may be eliminated. In some implementations, the image selection criterion may also include requirements tied to the external environment of the vehicle. Examples include requiring that the image be taken when the vehicle is moving on a flat road surface with no curvature or inclination.

If the sample image meets the image selection criteria, the process goes on to block 310. On the other hand, if the image selection criteria are not met, the process goes back to block 302 where another sample image from the first image sensor is selected. The steps in blocks 302 and 304 are repeated until a sample image which meets the image selection criteria is obtained. In block 310, a calibration structure in the form of a first set of parallel feature edges is selected. The first set of parallel feature edges comprises at least two feature edges which are parallel to each other. The actual number of parallel feature edges required may vary depending on the number of parallel features required to determine reference vanishing points for the type of image sensor being calibrated. For example, image sensors which can be modelled using the sphere camera model including central catadioptic systems using fisheye lenses only require two parallel feature edges in order to determine reference vanishing points which can be used for calibration. One or more calibration structure selection criteria may be used to decide between two or more sets of feature edges which are suitable to be used as calibration structures. For example, characteristics tied to the image quality of the feature edges may be used. The image of the selected first set of parallel feature edges may be subjected to image processing steps configured to improve the sharpness of feature edges. For example, the processing may suppress spurious edges by performing a connected component analysis and Random Sample Consensus (RANSAC) algorithm may be used to filter out erroneous image points which do not form part of the feature edges in the set.

Figure 4A:
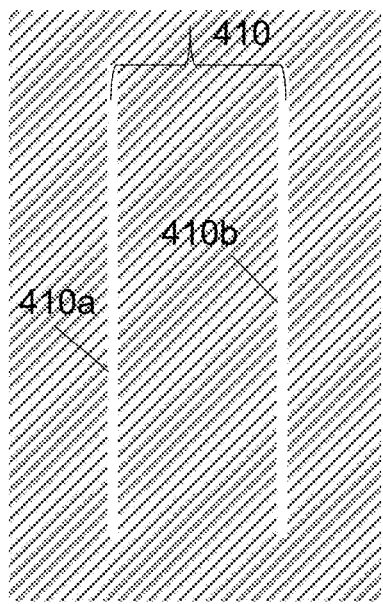
FIG. 4A illustrates an exemplary pair of parallel lane markings as it appears in the real world and FIG. 4B illustrates an image of the FIG. 4A lane markings as captured by a fisheye camera.
Figure 4B:
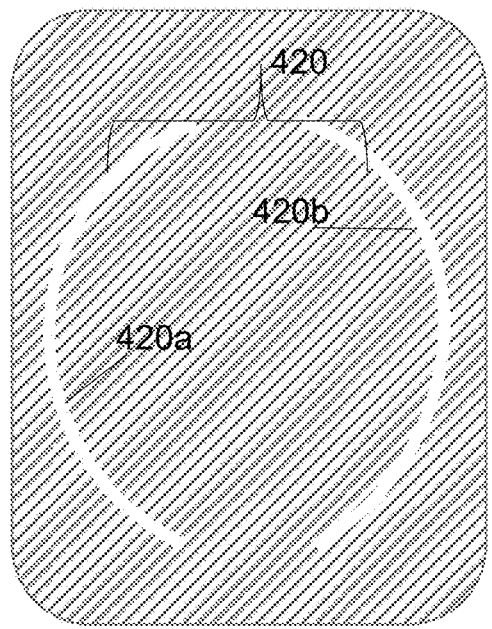

The process then goes on to determine reference vanishing points for the first set of parallel feature edges in block 320. The reference vanishing points being located on a projection reference frame. The projection reference frame may refer to the 2-dimensional image plane which appears in an image frame or any intermediate projection reference frame involved in the course of projecting a 3-dimensional point in the real world to the 2-dimensional image plane. For example, in the case of sphere camera model image sensors, the mapping of 3-dimensional points in the real world to a 2-dimensional image involves two projection steps. The first is a projection of the 3-dimensional point to a point on a unitary sphere and a second is a perspective projection from the unitary sphere to the image plane of the sensor. In this case, both the unitary sphere and image plane may function as projection reference frames. FIG. 4A shows an exemplary real-life view of a first set of parallel feature edges 410 comprising a pair of parallel longitudinal feature edges (410a, 410b). In one implementation, the longitudinal features form part of two parallel tracks of lane markings such as the lane markings 240a and 240b illustrated in FIG. 2. FIG. 4B is the corresponding image 420 of the first set of parallel feature edges in FIG. 4A when captured by an image sensor which can be modelled using the sphere camera model such as image sensors using fisheye lenses. It is known that for image sensors based on the sphere camera model, straight lines in the real world are projected in the image plane as conic curves which can be approximated as part of a circle due to non-linear distortion. This is illustrated in FIG. 4B where the straight-line first and second feature edges in FIG. 4A (410a, 410b) are projected as conic curves (420a, 420b) in the fisheye image plane.

Figure 5:
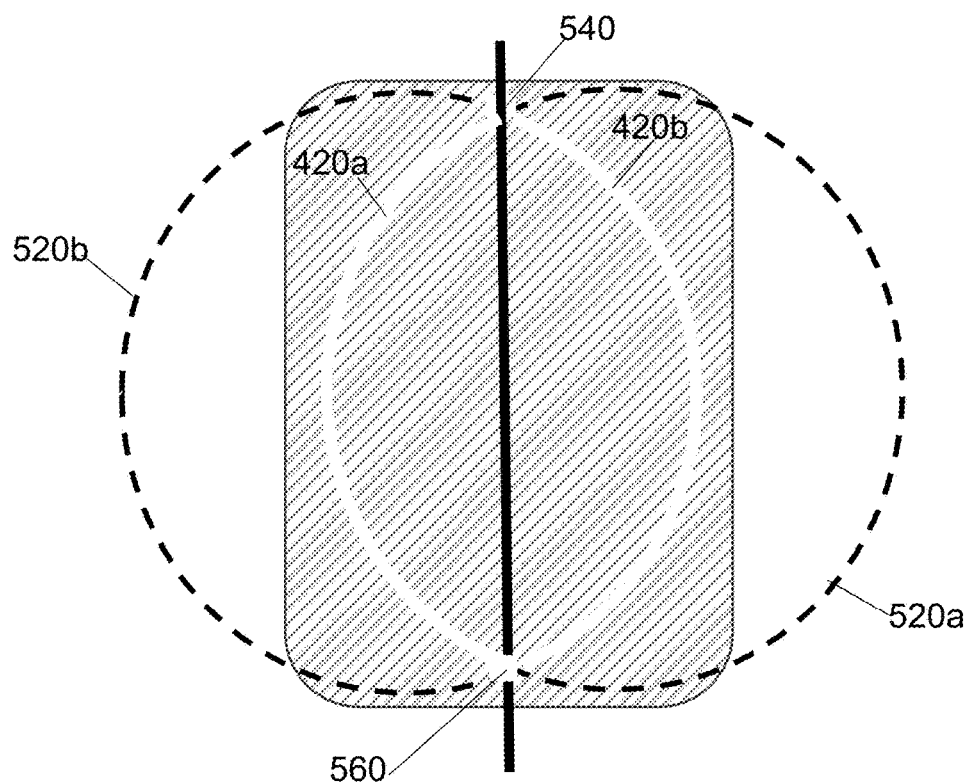
FIG. 5 illustrates an exemplary method of determining reference vanishing points associated with a first set of parallel feature edges by fitting circles to the image points of the respective feature edges.

In one implementation where the image sensor is based on the sphere camera model, reference vanishing points for the first set of parallel features in the image plane may be determined by fitting circles to the fisheye images of the first and second feature edges (420a, 420b) and finding the intersection points between the two circles. Other methods such as inverse fish eye mapping may also be used to derive the reference vanishing points. If the first and second feature edges are not parallel in the real world co-ordinates, they will at most intersect at one point and not two points. This theory may also be used as a means for determining if feature edges in a first set of parallel feature edges are parallel. Using the pair of parallel longitudinal feature edges in FIGS. 4A and 4B as an example, a first circle (520a) is fitted to the image of first feature edge (420a) and a second circle (520b) is fitted to the image of the second feature edge (420b). Images of the first and second feature edges are shown as white curves in FIG. 5. The radius and centre of the respective circles are chosen such that most of the image points for each feature edge lie on the circle. A minimum threshold percentage of image points may be set for this purpose. For example, the circles may be fitted such that 95% percent or more of the image points from the feature edges (e.g. 420a, 420b in FIG. 4B) fall on the circle. In some implementations, a gradient descent approach may be used to find a circle which best fits the maximum number of image points. This approach uses a Lose function (L) where the error function for each image point forming a feature edge with respect to a fitted circle of radius $R_j$ and centre $u_{0j}$ and $v_{0j}$ is defined in terms of the Euclidian distance of each image point to the centre of the circle and biased by the radius of the circle. The error for each of the image points is calculated and summed up.

$$\Sigma_{j=1}^{M}\Sigma_{i=1}^{N'}er_{ij},((uij-u_{0j})^2+|(v_{ji}-v_{0j})^2-R_j^2)^2 \quad (1)$$

where $(u_{ij}, v_{ij})$ are the image points at i, j on the parallel feature edges $(u_{0j}, v_{0j})$ and $R_j$ are the centre and radius of a fitted circle respectively Starting initially from a circle with centre $(u_0, v_0)$ and radius $(R_0)$ in the first iteration, a Lose function (L) is calculated using equation (1). The same is repeated iteratively by varying the location of the centre of the circle and its radius until we obtain a circle with a centre and radius which minimises or reduces the error function (which is the Lose function (L) in this example) such that it is within a threshold limit. The threshold limit may be defined based on a threshold percentage of image points that should lie on the circle. It will be appreciated by a person skilled in the art that apart from the lose function, other formulas for fitting a circle may also be suitable. FIG. 5 illustrates an example where a first and second circle (520a, 520b) are fitted to the image points of the first and second feature edges (420a, 420b) respectively. After fitting the first and second circles to the first and second feature edges, reference vanishing points for the first set of parallel feature edges may be derived by determining where the first and second circles intersect. For example, in the FIG. 4-5 illustration, the vanishing points are located at the points indicated by reference numerals 540 and 560. In one implementation, the reference vanishing points $[v_{l1} \; v_{l2}]^T$, and $[v_{h1} \; v_{h2}]^T$ may be determined by finding the values of $[v_{l1} \; v_{l2}]^T$, and $[v_{h1} \; v_{h2}]^T$ where the following circular equations are satisfied $$(u-u_{01})^2+(v-v_{01})^2-R_{01}^2=0 \qquad (2)$$

$$(u-u_{02})^2+(v-v_{02})^2-R_{02}^2=0 \qquad (3)$$

Figure 6:
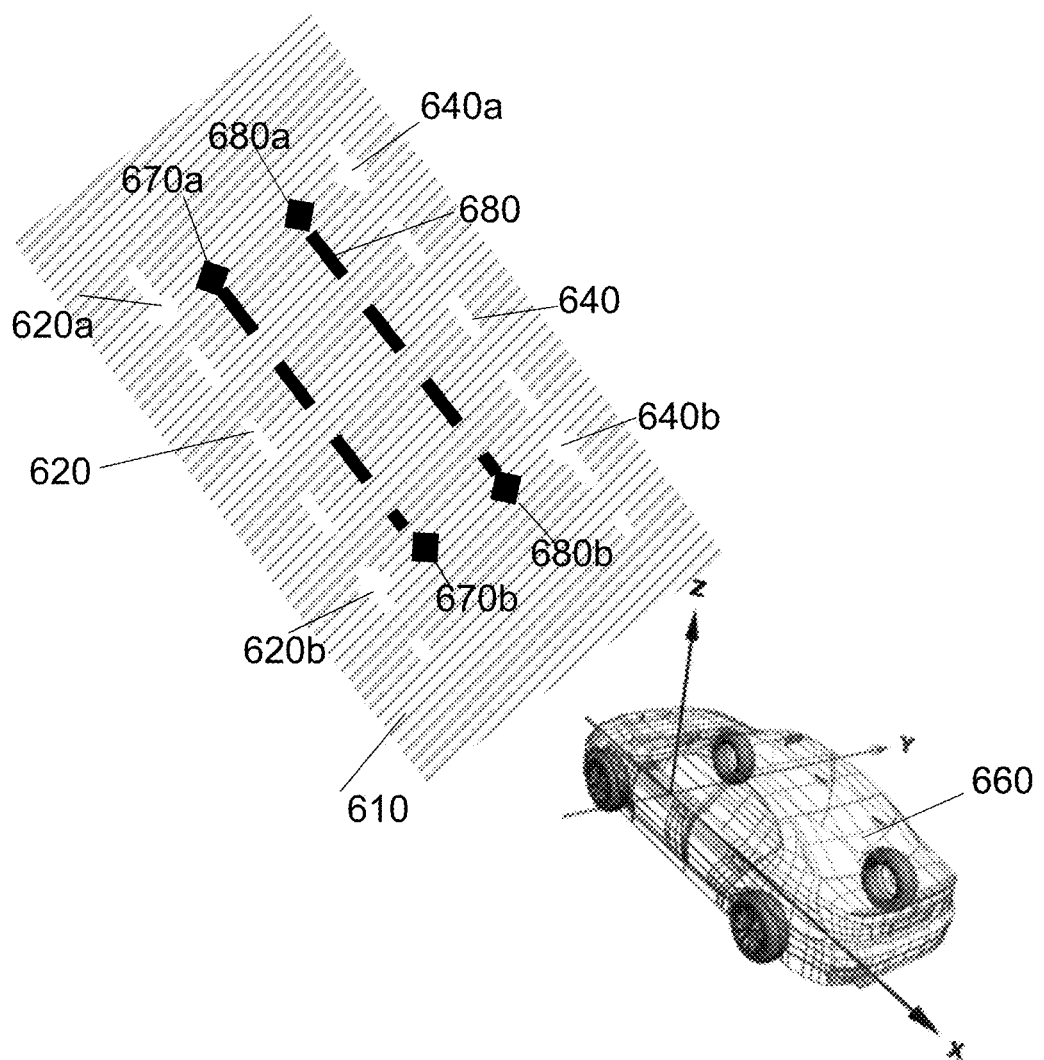
FIG. 6 illustrates an exemplary method for selecting a second set of parallel feature edges.

($u_{01}$, $v_{01}$), $R_1$=centre and radius of the first circle
($u_{02}$, $v_{02}$), $R_2$=centre and radius of the second circle After the reference vanishing points have been determined, the method goes on to block 330 where a second set of parallel feature edges on the ground plane which are parallel to the first set of parallel feature edges is selected. The second set of parallel feature edges may be actual feature edges which exist in the real world or virtual feature edges. FIG. 6 illustrates an exemplary method of selecting virtual feature edges for the second set of parallel feature edges. A road surface or ground plane 610 comprising a first set of parallel feature edges in the form of 2 parallel lane markings (620, 640) is shown. For purposes of illustration, we will assume that the image sensor is mounted on a vehicle 660 with a vehicle co-ordinate system comprising an x-axis extending along the longitudinal axis of the vehicle, a y-axis extending along a lateral axis of the vehicle such as the axle joining two side wheels and a z-axis extending out of the plane of the paper perpendicular to the x and y axis. The real world co-ordinates of two or more points on at least one of the lane markings (e.g. 620) with respect to the vehicle co-ordinate system is derived from the image frame. A second set of parallel feature edges located on the ground plane 610 and parallel to the lane markings (620, 640) may be derived by shifting the co-ordinates of points on at least one of the lane markings (e.g. 620) along the y-axis of the vehicle. Assuming for the purposes of illustration the first lane marking 620 comprises a point 620a with co-ordinates (x=−100, y=0, z=0) and another point 620b with co-ordinates (x=−10, y=0, z=0). A third feature edge belonging to the second set of parallel edges may be obtained by shifting the points 620a and 620b along the y axis of the vehicle co-ordinate system. As discussed earlier, if the steering and/or wheel angle of the vehicle is close to zero, the lane markings (620, 640) will be parallel to the x-axis of the vehicle co-ordinate system. Accordingly, by moving along the y-axis of the vehicle co-ordinate system while maintaining the x and z co-ordinates constant, points passing through a line parallel to the first lane marking 620 may be obtained. Applying this principle to the FIG. 6 example, the third feature edge 670 for the second set of parallel feature edges is derived by shifting the points 620a and 620b on the lane marking 620 along the y-axis thus obtaining points 670a and 670b with co-ordinates (x=−100, y=50, z=0) and (x=−10, y=50, z=0) respectively. The third feature edge 670 parallel to the lane marking 620 passes through points 670a and 670b. Similarly, a fourth feature edge 680 for the second set of parallel feature edges may be defined as the line passing through points (x=−100, y=150, z=0) and (x=−10, y=150, z=0) designated by reference numerals 680a and 680b in FIG. 6. The points 680a and 680b may be obtained by displacing the points 620a and 620b along the y axis of the vehicle co-ordinate system. After selecting a second set of parallel feature edges in block 330, the method goes on to block 340 where the processor projects a plurality of points from the second set parallel feature edges onto a projection reference frame of the image sensor based on a pre-existing projection matrix of the image sensor. Known modelling software such as Cam2 algorithm may be used for this purpose. Since the objective here is to check for any deviation between the vanishing points for the second set of parallel feature edges and the reference vanishing points, the projection reference frame where points from the second set parallel feature edges would be the same as the one where the reference vanishing points are derived with respect to. For instance, in the FIG. 4-5 example, the reference vanishing points were derived in block 320 was with respect to the image plane. Accordingly, points from the second set parallel feature edges will also be projected onto the image plane in block 340 so that second vanishing points on the image plane may be determined. The projection matrix of an image sensor is generally expressed in terms of an image sensor's intrinsic and extrinsic parameters. If this is the first round of projection onto the projection reference frame, a pre-existing projection matrix based on the last known intrinsic and extrinsic parameters is used for projecting the second set of parallel feature edges. Using the same sphere camera model image sensor example in FIG. 4-5, projecting a plurality of points from the second set parallel feature edges onto the image plane of the image sensor results in images of the third and fourth feature edges (770, 780) appearing as conic curves which can be approximated as part of a circle (see FIG. 7).

In block 350, the processor determines for the second set of parallel feature edges, second vanishing points located on the projection reference frame. Going back to the FIG. 4-5 example, since the image sensor is based on the sphere camera model, vanishing points for the second set parallel feature edges may also be derived by fitting circles to image points of the third and fourth feature edges (770, 780). The same circle fitting approach used for deriving the first and second circles associated with the first set of parallel feature edges may also be deployed here. Equation 4 shows the Lose function as applied to a fitted circle and radius in the first iteration $$L_R = \sum_{i=1}^{n} \sum_{j=1}^{m} er_{ij} \cdot ((ur_{ij} - ur_0)^2 + (vr_{ij} - vr_0)^2 + Rr_0^2) \qquad (4)$$

where
($ur_{ij}$, $vr_{ij}$) are the image points for projected feature edges at i, j
($ur_0$, $vr_0$) and $Rr_0$ are the centre and radius of a fitted circle respectively in the first iteration.

Figure 7:
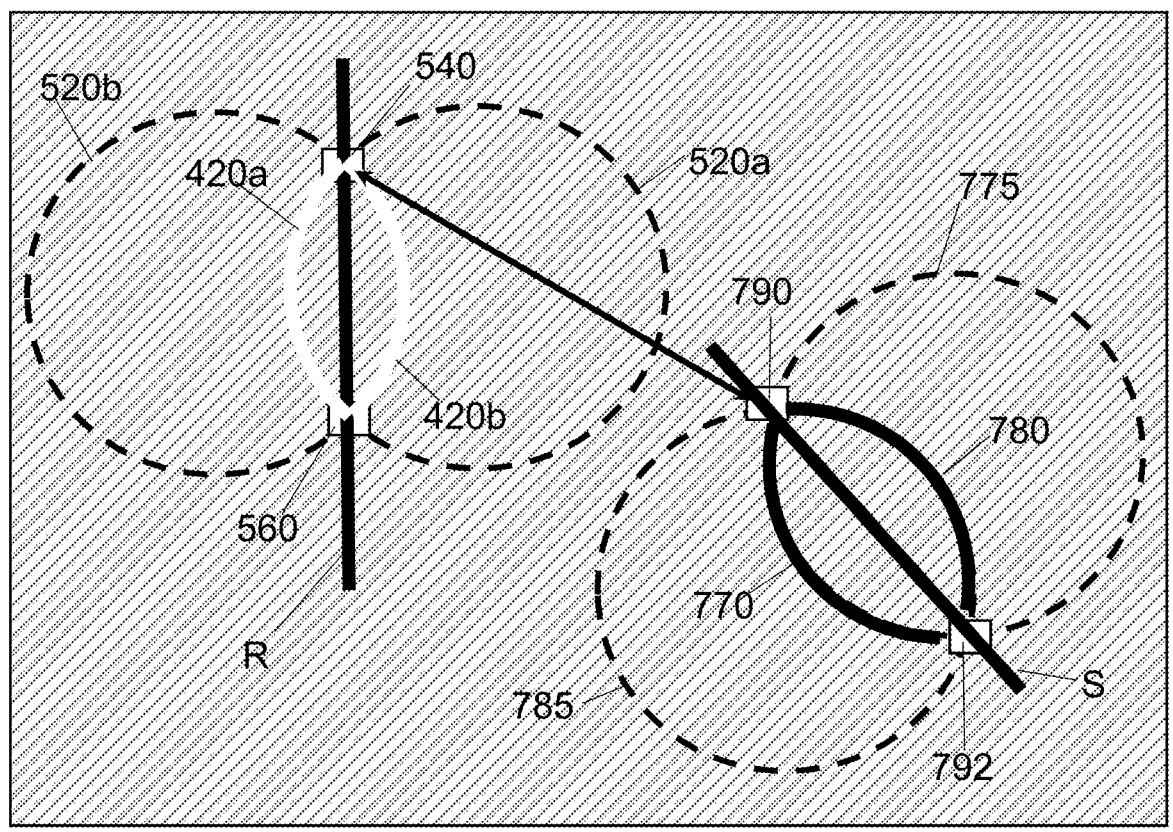
FIG. 7 illustrates an image plane containing image points for the first set of parallel feature edges in FIG. 5 and image points for a second set of parallel feature edges obtained by projection using a pre-existing projection matrix.

FIG. 7 shows a third circle 775 and a fourth circle 785 obtained by fitting to the image points of the third and fourth feature edges (770, 780) respectively. Since the third and fourth feature edges are parallel, the third and fourth circles intersect at points 790 and 792 which correspond to the vanishing points for the second set of parallel feature edges on the image plane (that is, the second vanishing points). The second vanishing points may similarly be obtained by solving circular equations similar to those for deriving the reference vanishing points in block 320. By way of example, the second vanishing points $[vr_{l1}\ vr_{l2}]^T$, and $[vr_{h1}\ vr_{h2}]^T$ may be determined by solving the following circular equations $$(u-u_0)^2+(v-v_{01})^2-rr_{01}^2=0 \qquad (5)$$

$$(u-ur_{02})^2+(v-vr_{02})^2-rr_{02}^2=0 \qquad (6)$$

$(ur_{01}, vr_{01})$, $rr_1$=centre and radius of the third circle
$(ur_{02}, vr_{02})$, $rr_2$=centre and radius of the fourth circle After the second vanishing points have been determined, the method checks for variations of the second vanishing points from the reference vanishing points in block 360. Based on the vanishing point concepts discussed earlier, the vanishing points for the first and second set of parallel features should coincide since their feature edges are all parallel to each other in the rea world. However, if there is an error in the projection matrix used for projecting points from the second set parallel feature edges onto a projection reference frame, the second set of parallel feature edges will no longer be parallel to the first set in the image plane or any other projection reference frame being used. Accordingly, the second vanishing points will not coincide with the reference vanishing points. For example, in FIG. 7 the second vanishing points (790, 792) derived in block 350 by projecting points from the second set parallel feature edges and the reference vanishing points (540, 560) derived in block 330 do not coincide even though the second set of parallel feature edges have been selected such that in the real world context the first and second set of parallel feature edges are parallel to each other. Such deviation in vanishing point location is indicative of an error in the pre-existing projection matrix. The method then goes on to decision block 370 which checks if any deviation in the location of the second vanishing points from that of the reference vanishing points is within acceptable predefined limits. If the variation is outside of acceptable predefined limits, the method goes to step 380 where the pre-existing projection matrix is modified by adjusting one or more of the extrinsic parameters before going back to block 340 and repeating blocks 340-360 until any deviation in the location of the second vanishing points is within acceptable predefined limits. The assumption here is that any error in the projection matrix is attributed to a shift in one or more extrinsic parameters instead of the intrinsic parameter values such as focal length, optical centre. On the other hand, if any variation between the reference and second vanishing points is with predefined limits, either because differences are originally within acceptable limits or becomes so after adjusting one or more extrinsic parameter values, the process goes to block 390.

In some sphere camera image sensor implementations where the reference and second vanishing points are derived by circle fitting, the process of reducing variations between the reference and second vanishing points may comprise drawing a first connecting line (R) joining the reference vanishing points (540, 560) and a second connecting line (S) joining the second vanishing points (790, 792). Going back to the example illustrated in FIGS. 4-5 and 7, the equation of the first connecting line, R, may be expressed as $$(u-v_{l2}) = \frac{(v_{ls}-v_{hs})}{(v_{l2}-v_{h2})}.(v-v_{l1}) \qquad (7)$$

and the gradient of the first connecting line $$\frac{(v_{l2}-v_{h2})}{(v_{l1}-v_{h1})} \qquad (8)$$

Similarly, the equation of the second connecting line, S, may be expressed as $$(u-vr_{l2}) = \frac{(vr_{l2}-vr_{h2})}{(vr_{l1}-vr_{h1})}.(v-vr_{l1}) \qquad (9)$$

and the gradient of the second connecting line as $$\frac{(vr_{l2}-vr_{h2})}{(vr_{l1}-vr_{h1})} \qquad (10)$$

In an optional variation, the one or more extrinsic parameters are initially adjusted to reduce any gradient discrepancy between the second and first connecting lines. The idea here is to match the gradient of the second connecting line to that of the first connecting line. The total slope error of the second connecting line to be reduced may be expressed as $$\left|\frac{(v_{l2}-v_{h2})}{(v_{l1}-v_{h1})} - \frac{(vr_{l2}-vr_{h2})}{(vr_{l1}-vr_{h1})}\right| \qquad (11)$$

The inventor has found that changes in orientation related extrinsic parameters tend to be manifested as a change in the slope of the second connecting line while changes in translation related extrinsic parameters do not have much effect on the slope of the second connecting line. Therefore, in a preferred embodiment, adjusting the one or more extrinsic parameters for gradient matching purposes preferably involves the adjusting one or more orientation related extrinsic parameters. When the gradient deviation between the second and first connecting lines is within a gradient limit, the location and/or length of the second connecting line may be adjusted to match that of the first connecting line by adjusting one or more of the extrinsic parameters. Preferably the extrinsic parameters which are adjusted are preferably translation related. In particular, the inventor has found that changes in y and z translation extrinsic parameters tend to cause location differences between the first and second connecting lines. x translation extrinsic parameters on the other hand tend to cause the length of the second connecting line to deviate from that of the first connecting line.

Adjustments (if any) made to reduce the gradient deviation between the second and first connecting lines will result in the first and second connecting lines being substantially parallel to each other and as such any distance between them may be approximated as a perpendicular distance between the two. Adjusting the second connecting line to reduce gradient deviations also results in the location of the second vanishing points being moved a distance of $\Delta u$ along a u direction and $\Delta v$ along a v direction. Accordingly, the new set of second vanishing points are $[vr_{l1}+\Delta u_{l1}\ vr_{l2}+\Delta v_{l1}]^T$. The distance between the reference vanishing line and the new second connecting line after gradient adjustment may therefore be approximated by the Euclidian distance corresponding pairs of vanishing lines. For example, if we refer to the reference vanishing point 540 in FIG. 7 as the upper reference vanishing point and second vanishing point 790 as the upper second vanishing point, the error function difference between them and the new set of second vanishing points may be expressed as $$(vr_{l1}+\Delta u_{l1}-v_{l1})^2+(vr_{l2}+\Delta v_{l1}-v_{l2})^2 \quad (12)$$

This distance may be reduced by recursively varying the y and z translation extrinsic parameters. When the distance deviation is with an acceptable margin of error, the lengths of the first connecting line and adjusted second connecting line may be adjusted preferably by adjusting the x translation extrinsic parameter so as to minimise or reduce any differences in length to an acceptable level. The lengths of the first and second connecting lines may be represented by the formulas shown in equations (13) and (14) below. The co-ordinates on the second connecting line being the ones after any prior adjustments for gradient and/or location deviations between the first and second connecting lines.

Length of first connecting line, $$l_1 = \sqrt[2]{(u_{l1} - u_{l2})^2 + (v_{l1} - v_{l2})^2}. \quad (13)$$

Length of second connecting line, $$l_2 = \sqrt[2]{(ur_{l1} - ur_{l2})^2 + (vr_{l1} - vr_{l2})^2} \quad (14)$$

Deviations in length may therefore be expressed as the absolute difference between $l_1$ and $l_2$. When any deviations of the second vanishing points from the reference vanishing points is with predefined limits, the process goes to block 390. The method ends at block 390. If there has been a change in one or more extrinsic parameters, the one or more revised extrinsic parameters derived by recursive execution of blocks 340-360 will be the new extrinsic parameter values used in the projection matrix.

Figure 8A:
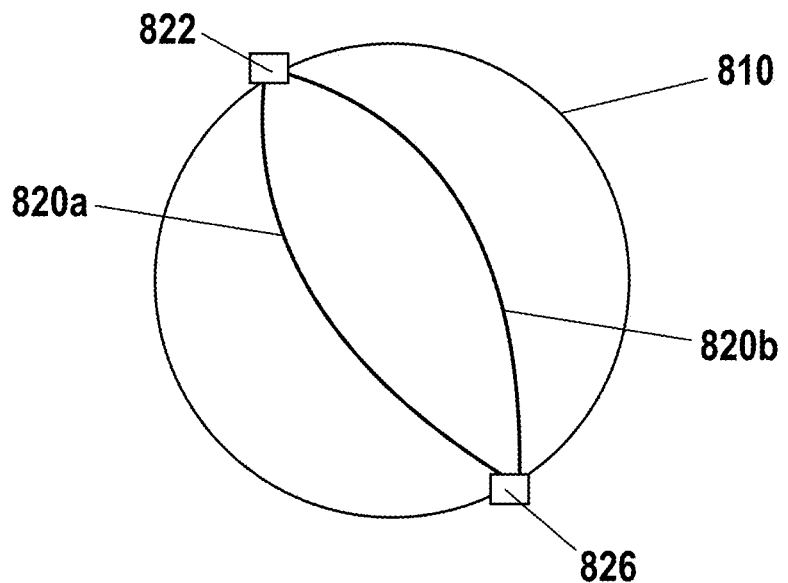
FIG. 8A illustrates another exemplary method of determining reference vanishing points by pixel mapping image points for a first set of parallel feature edges onto the surface of a unitary sphere.
Figure 8B:
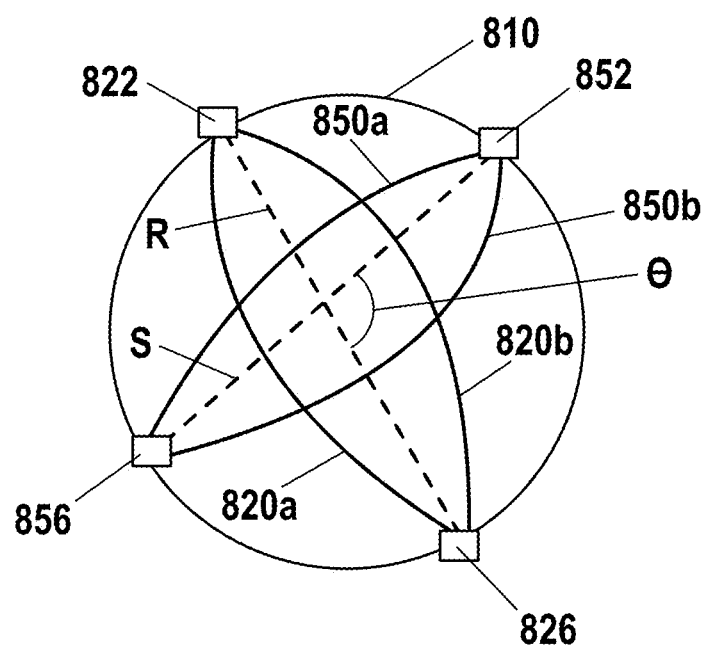
FIG. 8B shows a unitary sphere comprising second vanishing points associated with a second set of parallel feature edges, the second set of parallel feature edges being parallel to the first set of parallel feature edges in FIG. 8B.

As mentioned earlier, the projection reference frame may also be an intermediate projection reference frame. For example, according to the sphere camera model, the mapping of 3D points in the real world to a 2D image comprises a first projection of the 3D point to a point on a unitary sphere and a second perspective projection from the unitary sphere to the image plane of the sensor. Accordingly, image sensors which can be modelled using the sphere camera model may use the image plane or the unitary sphere as the projection reference frame. The location of the reference vanishing points on the unitary sphere may be derived by pixel mapping image points for the first set of parallel feature edges. FIG. 8A shows an example of a unitary sphere 810 where image points associated with a first and second parallel feature edge in a first set of parallel feature edges are mapped onto the unitary sphere pixel by pixel by circle fitting as first and second circles (820*a*, 820*b*). Under the sphere camera model, straight lines are projected as circles on the surface of a unitary sphere and parallel lines will intersect at two vanishing points corresponding to where the circles on the unitary sphere intersect. Accordingly, in the FIG. 8A, the vanishing points for the first and second feature edges are located at points 822 and 826 where the first and second circles intersect. FIG. 8B shows white coloured third and fourth circles (850*a*, 850*b*) obtained by projecting a plurality of points from a third and fourth parallel feature edge according to real world co-ordinates onto the unitary sphere 810 based on a pre-existing projection matrix of the image sensor. A cam2 module may be used for the projection. The third and fourth feature edges form a second set of parallel feature edges which are parallel to the first set of parallel feature edges. The points where the third and fourth circles (850*a*, 850*b*) intersect on the unitary sphere correspond to second vanishing points (852, 856) for the second set of parallel feature edges on the unitary sphere projection reference frame. In the FIG. 8B example, the second vanishing points (852, 856) differ in location from the reference vanishing points (822, 826). This indicates that one or more extrinsic parameters of the image sensor has drifted from its pre-existing value thus affecting the accuracy of the projection matrix. An automated extrinsic parameter calibration process may check to see if the differences are within acceptable predefined limits similar to block 360 in the FIG. 3 method and reduce the differences until they are within acceptable predefined limits by recursively adjusting one or extrinsic parameters and checking the new location of the second vanishing points. In some implementations, a first and second connecting line (R, S) connecting the reference (822, 826) and second vanishing points (852, 856) respectively may be drawn. Location differences between the reference and second vanishing points may then be reduced by first reducing any deviations in length of the second connecting line S from that of the first connecting line (R) and subsequently the angle Θ between the connecting lines (R, S). The length of the second connecting line S may be matched with that of the first connecting line by adjusting the z-translation extrinsic parameter and the orientation related extrinsic parameters adjusted to reduce the angle Θ within an acceptable margin of error.

While various aspects and implementations have been disclosed herein, other aspects and implementations will be apparent to those skilled in the art. For example, although the above description illustrates an aspect of this disclosure being applied to calibrate one or more extrinsic parameters of an image sensor mounted on a vehicle platform, the calibration methods and devices for calibrating one or more extrinsic parameters of an image sensors may also be applied to image sensors mounted on other types platforms whether stationary, mobile, autonomous or non-autonomous. The various aspects and implementations disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular implementations only, and is not intended to be limiting.

What is claimed is:

1. A method for calibrating one or more extrinsic parameters of an image sensor comprising:
   selecting a first set of parallel feature edges appearing in an image frame captured by the image sensor;
   determining reference vanishing points for the first set of parallel feature edges, the reference vanishing points being located on a projection reference frame of the image sensor;
   selecting a second set of parallel feature edges which are parallel to the first set of parallel feature edges;
   projecting a plurality of points from the second set parallel feature edges onto the projection reference frame based on a pre-existing projection matrix of the image sensor;
   determining for the second set of parallel feature edges, second vanishing points located on the projection reference frame; and
   reducing any deviation in location of the second vanishing points from the reference vanishing points until the deviation is within one or more predefined limits by recursively performing at least the following:
  modifying the pre-existing projection matrix by adjusting one or more of the extrinsic parameters;
  projecting a plurality of points from the second set parallel feature edges onto the projection reference frame using the modified pre-existing projection matrix; and
  determining the second vanishing points after projecting,
wherein the modifying the pre-existing projection matrix by adjusting the one or more of the extrinsic parameters comprises initially adjusting the one or more extrinsic parameters to reduce any gradient deviation between a first connecting line joining the reference vanishing points and a second connecting line joining the second vanishing points, until the gradient deviation is within a gradient limit before adjusting the one or more extrinsic parameters to reduce any deviations in location or length of the second connecting line from the first connecting line.

2. The method according to claim 1, wherein the image sensor is one which can be modelled using the sphere camera model.

3. The method of claim 2, wherein the projection reference frame of the image sensor is an image plane of the image sensor and the determining the first pair of reference vanishing points for the first set of parallel features comprises:
  fitting a first circle and second circle to image points of a first and second feature edge in the first set of parallel edges and determining where the first and second circles intersect.

4. The method of claim 3, wherein the determining the second vanishing points for the second set of parallel feature edges comprises:
  fitting a third circle and fourth circle to image points of a third and fourth feature edge in the second set of parallel edges obtained by projecting a plurality of points from the third and fourth feature edges in the second set parallel feature edges onto the image plane based on a pre-existing projection matrix of the image sensor; and
  determining where the third and fourth circles intersect.

5. The method according to claim 4, wherein fitting of at least the first, second, third or fourth circle is based on minimising a Lose function.

6. The method of claim 1, wherein:
  initially adjusting the one or more extrinsic parameters to reduce the gradient deviation between the second and first connecting lines until the gradient deviation is within the gradient limit comprises adjusting the one or more of the extrinsic parameters which is orientation related.

7. The method according to claim 1, wherein:
  adjusting the one or more extrinsic parameters to reduce any deviation in location and/or length of the first and second connecting lines comprises adjusting the one or more of the extrinsic parameters which is translation related.

8. The method of claim 2, wherein the projection reference frame is a unitary sphere.

9. The method according to claim 1, wherein the image sensor is mounted on a vehicle and the selecting the first set of parallel feature edges comprises:
  detecting at least two feature edges in the image frame; and
  determining if the feature edges are parallel by checking at least a steering angle or a wheel angle of the vehicle when the image frame was captured.

10. The method of according to claim 1, wherein the image sensor is mounted on a vehicle and the second set of parallel feature edges is obtained by shifting the first set of parallel feature edges along a co-ordinate axis of the vehicle located along a lateral axis of the vehicle.

11. The method according to claim 1, wherein the second set of parallel feature edges are virtual feature edges.

12. A device for calibrating one or more extrinsic parameters of an image sensor comprising:
  a processor;
  at least one memory coupled to the processor and storing instructions executable by the processor causing the processor to:
  select a first set of parallel feature edges appearing in an image frame captured by the image sensor;
  determine reference vanishing points for the first set of parallel feature edges, the reference vanishing points being located on a projection reference frame of the image sensor;
  select a second set of parallel feature edges which are parallel to the first set of parallel feature edges;
  project a plurality of points from the second set parallel feature edges onto the projection reference frame based on a pre-existing projection matrix of the image sensor;
  determine for the second set of parallel feature edges, second vanishing points located on the projection reference frame; and
  reduce any deviation in location of the second vanishing points from the reference vanishing points until the deviation is within one or more predefined limits by recursively performing at least the following steps:
    modify the pre-existing projection matrix by adjusting one or more of the extrinsic parameters;
    project a plurality of points from the second set parallel feature edges onto the projection reference frame using the modified pre-existing projection matrix; and
    determine the second vanishing points after projecting,
  wherein the modifying the pre-existing projection matrix by adjusting the one or more of the extrinsic parameters comprises initially adjusting the one or more extrinsic parameters to reduce any gradient deviation between a first connecting line joining the reference vanishing points and a second connecting line joining the second vanishing points, until the gradient deviation is within a gradient limit before adjusting the one or more extrinsic parameters to reduce any deviations in location or length of the second connecting line from the first connecting line.

13. The device of claim 12, wherein the image sensor is one which can be modelled using a sphere camera model, the projection reference frame is the image plane of the image sensor and the at least one memory causes the processor to:
  determine the reference vanishing points by fitting a first circle and second circle to image points of a first and second feature edge in the first set of parallel edges wherein the reference vanishing points are located where the first and second circles intersect;
  determine the second vanishing points by fitting a third circle and fourth circle to image points of a third and fourth feature edge in the second set of parallel edges obtained by projecting a plurality of points from the third and fourth feature edges onto the image plane of the image sensor, wherein the second vanishing points are located where the third and fourth circles intersect.

14. The device according to claim 12, wherein the image sensor is mounted on a vehicle and the at least one memory causes the processor to select a first set of parallel feature edges by at least:
  detecting at least two straight line feature edges in the image frame; and
  determining if the straight line feature edges are parallel by checking at least a steering angle or a wheel angle of the vehicle when the image frame was captured.

15. The device according to claim 12, wherein the image sensor is mounted on a vehicle and the at least one memory causes the processor to select a second set of parallel feature edges by shifting the first set of parallel feature edges along a co-ordinate axis of the vehicle that is located along a lateral axis of the vehicle.

16. A non-transitory computer-readable storage medium comprising computer-readable instructions for carrying out the method according to claim 1.

17. A vehicle comprising a device for calibrating one or more extrinsic parameters of an image sensor according to claim 12.

* * * * *